Figure 1:
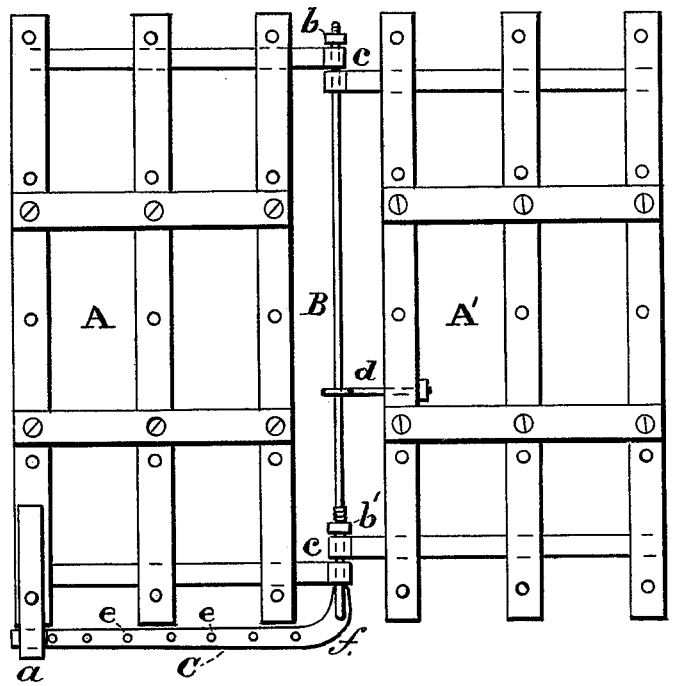
Figure 2:
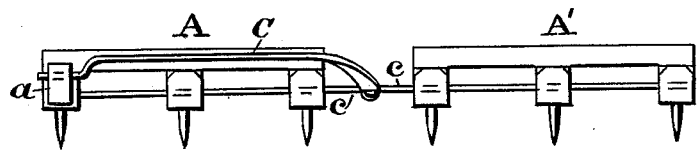

R. M. SKINNER.
Harrow.

No. 202,671. Patented April 23, 1878.

Witnesses:
Walter F. Fowler
R B Dorsey

Inventor:
Roswell M. Skinner
by Knight & Knight
Attorneys.

UNITED STATES PATENT OFFICE.

ROSWELL M. SKINNER, OF TONTOGANY, OHIO.

IMPROVEMENT IN HARROWS.

Specification forming part of Letters Patent No. 202,671, dated April 23, 1878; application filed January 27, 1878.

*To all whom it may concern:*

Be it known that I, ROSWELL M. SKINNER, of Tontogany, in the county of Wood and State of Ohio, have invented certain new and useful Improvements in Harrows; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure I is the top view of a harrow with my improvements attached. Fig. II is a front view, showing the arrangement of the elevated draft-bar and the mode of securing it at one end.

My improvement consists in the manner of coupling the harrows or wings of a harrow by means of a longitudinal hinge bar or rod, and in applying the draft directly to the above-mentioned hinge bar or rod, instead of to the harrow or wings of a harrow, whereby the harrows or wings may be used singly or both together, and elevated for the purpose of removing rubbish, or avoiding stumps, stones, and other obstacles, without in any way interfering with or impeding the progress of the team.

The harrows or wings A and A' are coupled by means of the longitudinal hinge bar or rod B, as shown in Fig. I, passing through the eyes *c c* and the eyebolt or ring *d* in such a manner as to keep the hinge bar or rod B from springing laterally. This hinge bar or rod is prevented from a longitudinal motion by means of the two nuts *b* and *b'*.

The draft-bar C, as shown in Fig. I, to which the team is attached, is a continuation of the longitudinal hinge bar or rod B, curved at the point *f*, at the head of the wing A, and running thence at a right angle with the said hinge bar or rod, in front of the wing A of the harrow, and secured at its extremity by the cleat *a* in such a manner as to give it additional strength and prevent it from springing when heavy draft is applied. It is also provided with a number of holes, *e e*, through which to pass the clevis-pin used in attaching the team to the draft-bar. The object of the said holes *e e* is to graduate the distance between the teeth and produce a coarse or fine harrow, accordingly as any of them are make use of, which will compel the harrow to be drawn in an angle, or "catacornered." Thus it is evident that any number of graduations may be produced by increasing the number of the holes. This draft-bar C, as shown in Fig. II, is raised to a level with or above the top surface of the wing A, in order to overcome the tendency of the draft to raise the front teeth from the ground by producing a downward weight, thereby bringing the force of the draft to bear down in front, and so to keep the whole area of the teeth on the ground.

It will thus be evident that by my improvement greater ease and convenience is arrived at in the working of harrows, from the fact that by reason of this improved way in which I apply the draft directly to the hinge bar or rod, instead of to the body of either harrow or wings, the two harrows or wings are free to be raised while the team is in motion without impeding its progress, for the purpose of avoiding obstacles.

Having thus described my invention, what I claim, and desire to secure by Letters Patent, is—

The hinge bar or rod B, running along between the harrows or wings, and curved at the head of the harrow or one of the wings, and secured by the cleat *a* at one end, forming the bar to which the draft is attached, substantially as and for the purposes set forth.

In testimony that I claim the foregoing as my own I affix my signature in presence of two witnesses.

ROSWELL M. SKINNER.

Witnesses:
   GEO. F. GRAHAM,
   W. E. HERTFORD.